(12) United States Patent
Edwards et al.

(10) Patent No.: US 6,312,337 B1
(45) Date of Patent: Nov. 6, 2001

(54) ONLINE DIGITAL PHOTOGRAPHY GAME SYSTEM

(75) Inventors: Eric Edwards, San Francisco; Clay Harvey Fisher, Belmont; Kurt Jonach, San Jose, all of CA (US); Neal Jacob Manowitz, Woodcliff Lake, NJ (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/672,225

(22) Filed: Sep. 27, 2000

Related U.S. Application Data
(60) Provisional application No. 60/181,776, filed on Feb. 11, 2000.

(51) Int. Cl.$^7$ ...................................................... A63F 9/24
(52) U.S. Cl. .............................. 463/42; 463/9; 273/429; 434/322
(58) Field of Search ............................. 463/1, 9, 13, 15, 463/41, 42; 275/429, 430, 431, 432; 434/322, 325, 350; 70/91–93

(56) References Cited

U.S. PATENT DOCUMENTS

| | | | |
|---|---|---|---|
| 5,643,088 | * | 7/1997 | Vaughn et al. ........................ 463/40 |
| 5,679,075 | * | 10/1997 | Forrest et al. ........................... 463/9 |
| 5,942,969 | * | 8/1999 | Wicks ................................... 340/323 |
| 6,074,299 | * | 6/2000 | Cohen ..................................... 463/42 |
| 6,085,195 | * | 7/2000 | Hoyt et al. ............................. 707/10 |
| 6,102,406 | * | 8/2000 | Miles et al. .......................... 273/430 |
| 6,102,796 | * | 8/2000 | Pajitnov et al. ......................... 463/9 |
| 6,178,258 | * | 1/2001 | Sugimoto ............................. 382/154 |

* cited by examiner

Primary Examiner—Valencia Martin-Wallace
Assistant Examiner—John M Hotaling, II

(57) ABSTRACT

An online digital photography game system allows multiple participants in the game by submitting digital photography game entries, where the digital photography game system determines a game winner based on equivalency with a game solution. The digital photography game system allows a user to choose a particular game and to save incomplete game entries. Digital photography games may require an entry fee for participation. Additionally, one or more participants can be rewarded for their participation in the game.

37 Claims, 4 Drawing Sheets

ONLINE DIGITAL PHOTOGRAPHY GAME SYSTEM

RELATED APPLICATIONS

This application claims the benefit of U.S. Provisional Application No. 60/181,776 filed Feb. 11, 2000.

FIELD OF THE INVENTION

This invention relates generally to online computer games, and more particularly, to online digital photography game systems.

COPYRIGHT NOTICE/PERMISSION

A portion of the disclosure of this patent document may contain material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright® 1999, Sony Electronics Inc., All Rights Reserved.

BACKGROUND OF THE INVENTION

With the increasing popularity of computing and the use of the Internet, in many fields, traditional analog technology is being replaced by digital technology. One example of this transformation is in the field of photography. As is well known in the art, traditional photography involves conventional film and chemical processing, whereas digital photography involves the creation of digital photograph files and the manipulation of the digital photograph through digital processing. Generally, digital photography is advantageous over traditional photography since the repetitive costs of film and chemical processing are eliminated. Furthermore, digital photograph files provide a more permanent storage format previously unavailable to photographers.

Disadvantages in the early development stages of digital photography included color and resolution control although with the advent of 2 megapixel and above digital cameras, these initial problems are being overcome. Additionally, digital photograph files are generally large and occupy a significant portion of disk space requiring digital photographers to be equipped with relatively high-powered personal computers.

Several digital photography web sites currently enable computer users to upload and store digital photograph files in user accounts on the Internet using the World Wide Web (web). Digital photograph files may be created by scanning conventional film photographs or may be created directly through the use of a digital camera and uploading the digital photograph files either directly through a PCMCIA card or through the use of hardware such as flash memory cards, USB ports, and application software.

These digital photography web sites, however, are limited in scope to general digital photography information, commercial film processing services that also create and provide digital photograph files, commercial digital photograph processing, and free file storage space for digital photograph files and digital photography albums.

SUMMARY OF THE INVENTION

An online digital photography game system automatically administers digital photography games and declares game winners. A digital photography game is created and published online. The digital photography game system receives a digital photography game entry from a user. An entry fee may be required for the user to participate in the digital photography game. The digital photography game processes the game entry. In another aspect of the invention, the entry may be compared against a pre-determined digital game solution. The digital photography game winner is declared. Additionally, users may receive awards such as recognition, prizes or cash for participation in the digital photography game.

Online digital photography games expand the utility of the web for digital photography by providing computer users and digital photography enthusiasts with an accessible and stimulating arena for utilizing digital photography. As a result, the field of digital photography may be advanced and adoption of digital photography furthered.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention. The following detailed description is, therefore, not to be taken in a limiting sense, and the scope of the present invention is defined only by the appended claims.

Figure 1A:
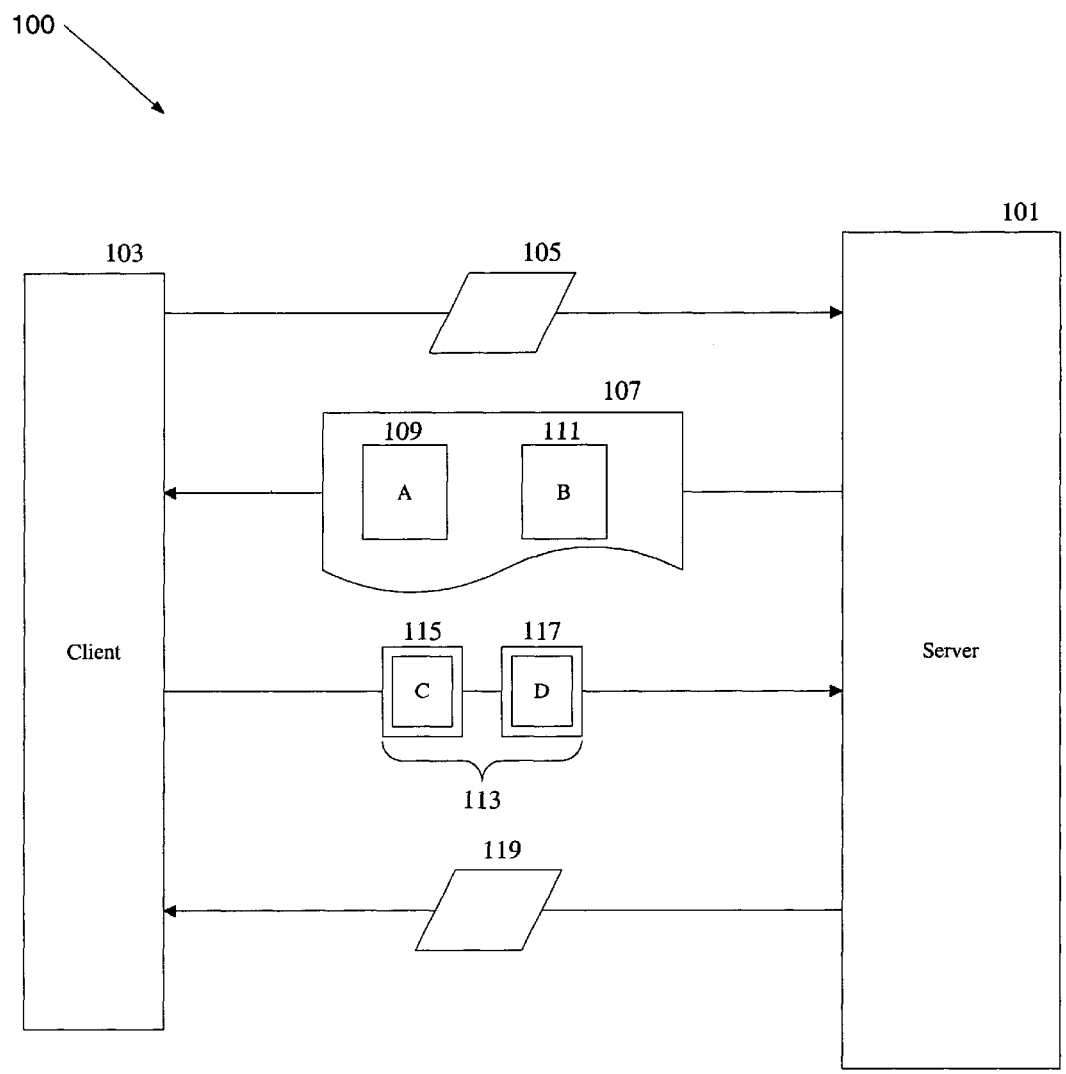
FIG. 1A is a diagram illustrating an overview of the operation of an embodiment of a networked digital photography game according to the invention.

Beginning with an overview of the operation of the invention, FIG. 1A illustrates one embodiment of a networked digital photography game having a digital photography game server 101 that processes digital photography game entries from a set of digital photograph files supplied from a client computer 103 by a user. The files may be digital photographs, scanned conventional photographs, clip art, or other types of digital images.

The client computer 103 sends a message 105 to the server computer 101 requesting to participate in the digital photography game. In response, the server 101 posts a digital photography game 107 in the form of instructions, instruction A109, and instruction B111. In response to receiving the instructions, the client posts a game entry 113 consisting of images C115 and D117. Image C115 corresponds to the instruction A109 and forms one subset of the game entry 113. Image D117 corresponds to instruction B111 and forms another subset of the game entry 113. Upon receiving the game entry 113, the server 101 processes the game entry 113. The server 101 determines if the digital photography game entry is equivalent to a game solution and declares at least one digital photography game winner. In another aspect of the invention, the server 101 posts a game solution on the web site and publishes the game result 119 on the web for public viewing on the client computer 103. Alternatively, the game result may be published on the web site, but in such as manner as to limit the display to private viewing on a client computer 103.

Figure 1B:
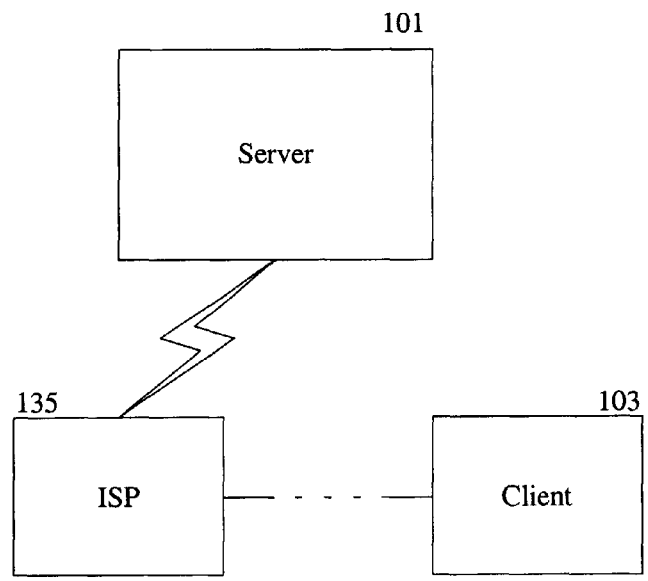
FIGS. 1B and 1C are diagrams of a computer environment suitable for practicing the invention.

In one embodiment of an online digital photography game system, as shown in FIG. 1B, the digital photography server 101 hosts a digital photography game web site and is part of, or coupled to, an ISP (Internet Service Provider) 135 to provide digital photography games over the Internet. The client computer 103 executes a conventional Internet browsing application to exchange data with the server 101. It is readily apparent that the present invention is not limited to Internet access and Internet web-based sites; directly coupled and private networks are also contemplated.

Figure 1C:
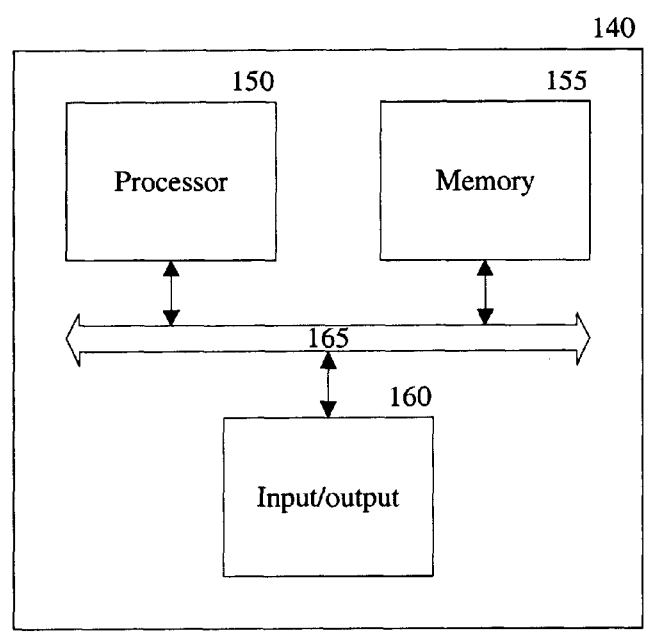

One embodiment of a computer system suitable for use as the digital photography web site server 101 is illustrated in FIG. 1C. The computer system 140, includes a processor 150, a memory 155 and input/output capability 160 coupled to a system bus 165. The memory 155 is configured to store instructions which, when executed by the processor 150, performs the methods described herein. The memory 155 may also store content for the digital photography game and digital photography game entries. Input/output 160 provides for the delivery and display of the content of the digital photography game or portions or representations thereof. Input/output 160 also encompasses various types of computer-readable media, including any type of storage device that is accessible by the processor 150. One of skill in the art will immediately recognize that the term "computer-readable medium/media" further encompasses a carrier wave that encodes a data signal. It will also be appreciated that the server 101 is controlled by operating system software executing in memory 155. Input/output and related media 160 store the computer-executable instructions for the operating system and methods of the present invention as well as the content for the digital photography game.

The description of FIGS. 1B and 1C are intended to provide an overview of computer hardware and other operating components suitable for implementing the invention, but is not intended to limit the applicable environments. It will be appreciated that the computer system 140 is one example of many possible computer systems that have different architectures. A typical computer system will usually include at least a processor, memory, and a bus coupling the memory to the processor. One of skill in the art will immediately appreciate that the invention can be practiced with other computer system configurations, including microprocessor systems, minicomputers, mainframe computers, and the like. The invention can also be practiced in distributed computing environments where tasks are performed by remote processing devices that are linked through a communications network.

Figure 2A:
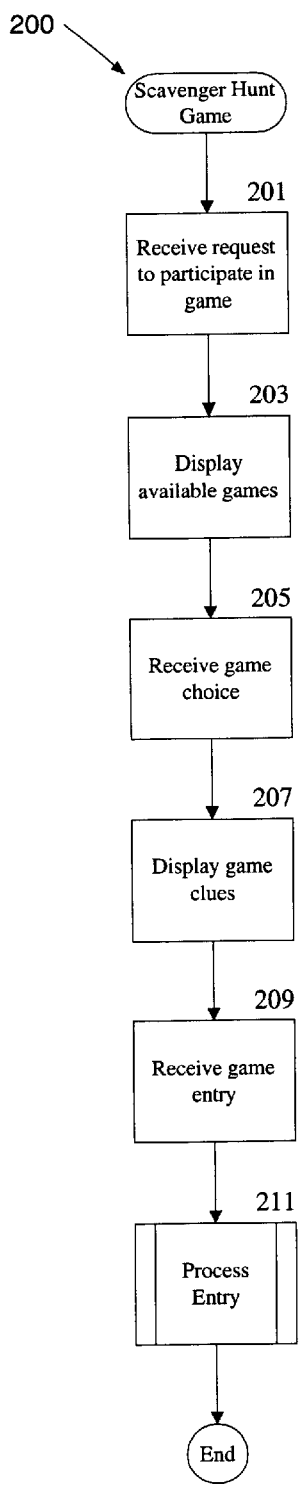
FIGS. 2A–2C are flow diagrams of methods to be performed by a server computer to administer digital photography games according to an embodiment of the invention.
Figure 2B:
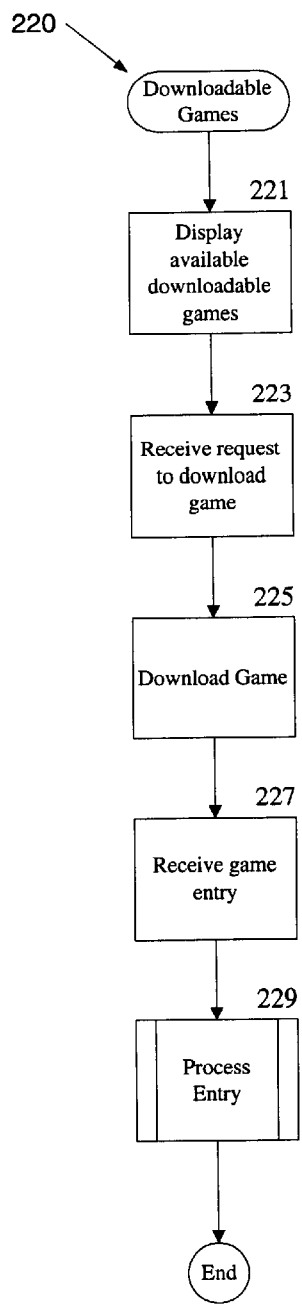

Next, the particular methods of the invention are described in terms of computer software with reference to flow diagrams. FIGS. 2A and 2B illustrates examples of embodiments of a scavenger hunt method 200, a downloadable game method 220, and the supporting methods executed by a computer, such as the server 101 of FIG. 1A. The methods constitute computer programs made up of computer-executable instructions illustrated as blocks (acts) 201 until 211 in FIG. 2A, blocks 221 until 229 in FIG. 2B, and blocks 251 until 267 in FIG. 2C. It will be appreciated that not all of the blocks depicted in the flow diagrams are required to practice the invention. Furthermore, the functions represented by blocks may be performed in a different order without departing from the scope of the invention.

Describing the computerized methods by reference to flow diagrams enables one skilled in the art to develop programs including instructions to carry out the methods on a suitable computer (the processor of the computer executing the instructions from computer-readable media). If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g. program, procedure, process, application, module, logic, etc.), as taking an action or causing a result. Such expressions are merely a shorthand way of saying that execution of the software by a computer causes the processor of the computer to perform an action or produce a result.

A scavenger hunt game is a widely recognized game wherein clues are given to game participants who are then tasked with solving the clues and acquiring described items. In one embodiment, the digital photography scavenger hunt game includes the acquisition of digital photographs by a plurality of computer users and the participation of users in the digital photography scavenger hunt game online. The online digital photography scavenger hunt game may be organized geographically into regional games or may be organized as a national or world-wide game offering awards commiserate with the difficulty in acquiring the digital photographs.

The scavenger hunt method 200 begins by receiving a request to participate from the user (block 201). In response to the received request, a list of available games is posted at block 203. A game is selected by the user and the selection is received at block 205. In response to the game selection, game clues are published at block 207. Clues may be published in aggregate or they may be sequentially displayed in accordance with a schedule.

In response to the published clues, users solve the clues and accumulate digital photographs. Digital photograph files may be created by scanning conventional photographs into a client computer using known application software or alternatively, the user may create digital photograph files directly on computer readable media by using a digital camera.

In another embodiment, the digital photography game may publish a requirement that the digital images associated with the published clues be acquired using a digital camera and that the acquired digital images be transferred from a photograph location. In response to the published requirement, users transfer the acquired digital photograph files from the photograph location using a cellular signal. In response to receiving the cellular signal, the server verifies that the received digital photograph file was transferred from a pre-determined location.

In one embodiment once all of the digital photographs have been acquired for a particular game, users upload the digital photograph files into a digital photography game entry. In another embodiment, the server may store in memory an incomplete game entry in a working game entry area until all of the clues have been published and the game entry is completed or until the game is terminated whichever occurs first. In yet another embodiment, the user posts the digital images associated with the game in a working game entry area. The accumulated photographs are received as a digital photography game entry at block 209. The game entry is then processed at block 211. Upon determination of a game winner, the game solution is posted on the website, the results of the digital photography game are published, and the game is terminated.

Yet another embodiment of an online digital photography game method is shown in the FIG. 2B flow diagram. A downloadable game 220 is illustrated. Available games are displayed at block 221. The server receives a request to download a game at block 223. In response, a game is downloaded at block 225. The game is played similarly to the online digital photography scavenger hunt game 200 with the exception that the game is executed on the client computer system versus online on a server. A game entry is received at block 227. Once a completed game entry is received at block 227, the game entry is processed at block 229. Upon determination of a game winner, the game is terminated.

In a further embodiment (not shown), the owner of the server requires compensation when a request to participate in a digital photography game is received. The server may request a payment when the user indicates that he/she wants to participate or the user may subscribe to a plan that allows a certain number of games to be entered for a single fee. The server may validate the compensation received and may disallow access to the digital photography game until the validated compensation is received.

In another embodiment, the owner of the server requires compensation from an advertiser upon displaying an advertisement as part of an online digital photography game, e.g. a banner advertisement. In yet another embodiment, the owner of the server requires compensation to incorporate an advertiser's product into a series of scavenger hunt clues as part of an online digital photography game. It will be appreciated that other compensation schemes can be implemented on the server without exceeding the scope of the invention.

Figure 2C:
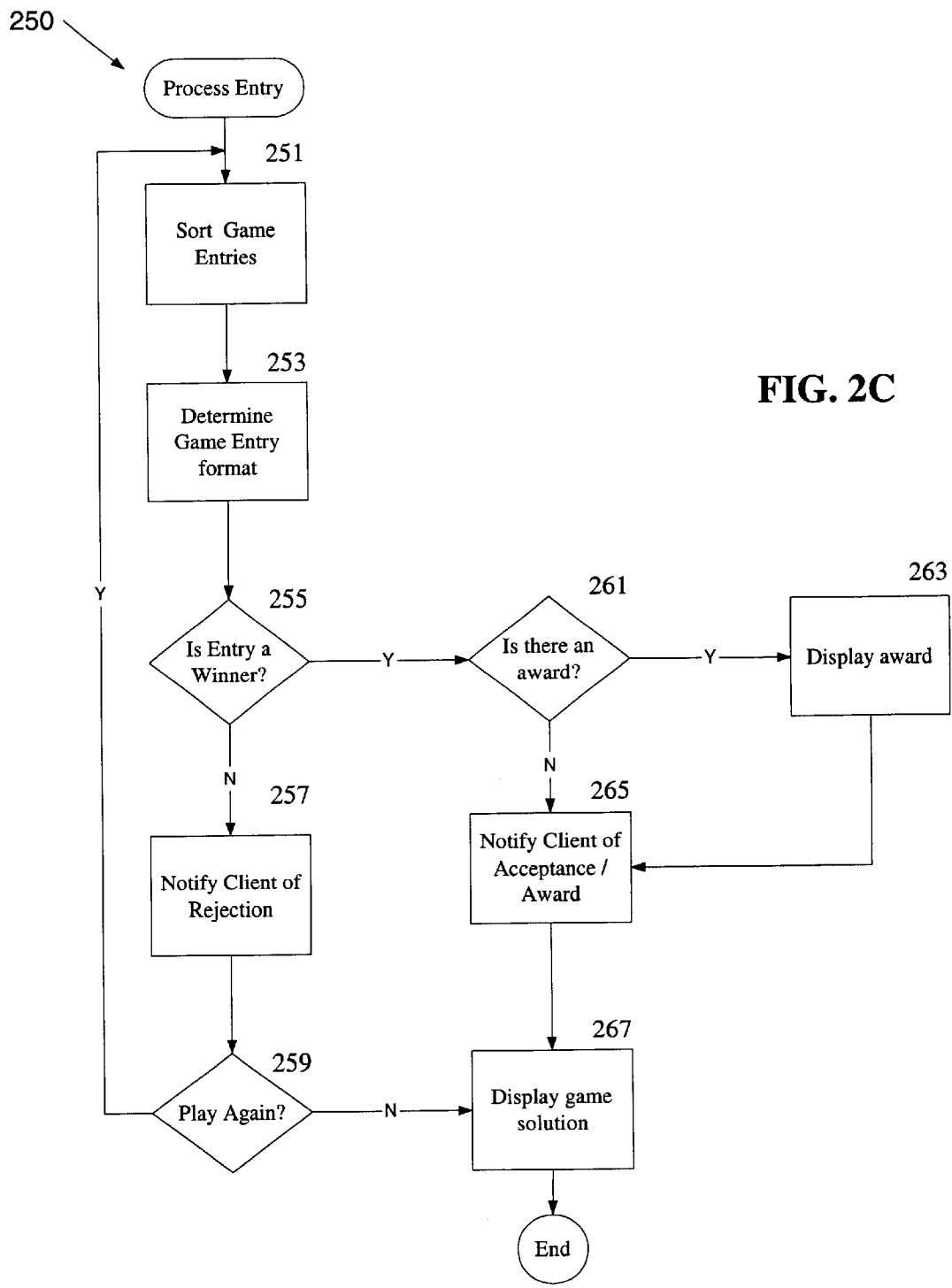

Turning now to FIG. 2C, one embodiment of a method 250 for processing game entries is illustrated. A game entry may consist of a plurality of digital photograph files. In response to receiving a game entry, the server sorts the game entry in accordance with the selected game at block 251. The server may further sort the game entry by the pre-assignment of a unique digital photography game identifier, in the order the completed game entry was received, or by game instruction. It will be appreciated that other sorting criteria may be used without departing from the scope of the invention.

Once the server has sorted the game entry, the server analyzes the game entry file format and may convert the game entry file format to a standard file format at block 253, such as JPEG, TIFF, GIF, JFIF, BMP, TIFF/EP, FPX, EPS, PICT, PCD, APS, ExIF, and FITS. The server evaluates the sorted and standardized game entry to determine if the game entry is a winner at block 255. In one aspect of the invention, the server may determine the winner by digitally comparing the game entry to a preexisting digital game solution.

If the game entry is a winner, the server determines whether an award is being provided for the selected game at block 261. If an award is being offered, the server displays the award at block 263. It will be appreciated that an award may take many forms such as a cash award, prizes, or participant recognition.

After the award is displayed or if no award is being offered, the server notifies the user of acceptance at block 265. The server may notify users by using various methods including existing electronic mail formats and web site displays. The server publishes the game solution at block 267. Upon declaring a game winner, the server terminates the game.

If the game entry is not a winner, the server rejects the game entry and notifies the user of the rejection at block 257. The server queries if the user would like to play again at block 259. If the response is affirmative, the server allows receipt of a second game entry. If the response is negative, the server displays the game solution at block 267 and the game is terminated.

In yet another embodiment, the digital photography game system may be modified based on the receipt of user inputs such as creating a game theme by entering game instructions such as clues, hints, topics and digital solutions into the downloaded game.

An online digital photography game system has been described that expands the utility of the web within the field of digital photography. Alternate embodiments of online digital photography game systems have been described including an online digital photography scavenger hunt game and a downloadable digital photography game. Additionally, the digital photography game system includes an example of a method for processing digital photography game entries.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

The terminology used in this application with respect to network architecture is meant to include all client-server environments. Therefore, it is manifestly intended that this invention be limited only by the following claims and equivalents thereof.

What is claimed is:

1. A computerized method for administering a digital photography game system comprising:

providing a digital photography game for online access by multiple participants, the digital photography game comprising a set of game instructions;

receiving a digital photography game entry from the multiple participants, the digital photography game entry comprising a number of digital images associated with each game instruction;

determining if the digital photography game entry is equivalent to a game solution; and declaring at least one digital photography game winner based on an equivalency of the digital photography game entry with the game solution.

2. The computerized method of claim 1 further comprising:

sorting the digital photography game entry by a unique game identifier; and sorting the digital photography game entry by an order in which the digital photography game was received.

3. The computerized method of claim 1 wherein the digital photography game entry comprises a plurality of digital photograph files, each of the plurality of digital photograph files having a file format selected from the group consisting of TIFF, APS, PCD, PICT, EPS, FPX, Exif, JPEG, TIFF/EP, GIF, JFIF, BMP, and FITS.

4. The computerized method of claim 1 further comprising:
requiring creation of the digital photography game entry using a digital camera.

5. The computerized method of claim 2 further comprising:
converting the received digital photograph files into a standard file format selected from the group consisting of TIFF, APS, PCD, PICT, EPS, FPX, Exif, JPEG, TIFF/EP, GIF, JFNF, BMP, and FITS.

6. The computerized method of claim 1, wherein receiving the digital photography game entry comprises:
receiving a set of digital images as a plurality of subsets, each subset comprising a digital image associated with one of a plurality of game instructions; and
identifying the digital photography game associated with the digital photography game entry; and
associating the game solution with the digital photography game entry.

7. The computerized method of claim 6 further comprising:
storing a partial digital photography game entry in a working game entry area.

8. The computerized method of claim 6 further comprising:
receiving a plurality of digital photography game entries for the same digital photography game.

9. The computerized method of claim 8 wherein receiving a plurality of digital photography game entries for the same digital photography game further comprises:
receiving each of the plurality of digital photography game entries for the same digital photography game from a cellular signal; and
verifying that the cellular signal originated from a predetermined location.

10. The computerized method of claim 1 wherein determining if the digital photography game entry is equivalent to the game solution comprises:
comparing a resolution of the digital photograph file with a digital game solution;
comparing a color of the digital photograph file with the digital game solution; and
comparing an aggregate pixel content of the digital photograph file with the digital game solution.

11. The computerized method of claim 1 further comprising:
notifying the multiple participants of the at least one digital photography game winner.

12. The computerized method of claim 1 further comprising:
determining a reward for participation in the digital photography game.

13. The computerized method of claim 1 further comprising:
publishing the game solution online for public viewing.

14. The computerized method of claim 1 further comprising:
publishing the game solution online for private viewing.

15. A computer-readable medium having computer-executable instructions to cause a computer to perform a method comprising:

identifying a digital photography game from a plurality of digital photography games, the digital photography game comprising a set of game instructions;
receiving a digital photography game entry from a user, the digital photography game entry comprising a number of digital images associated with each game instruction; and
determining an equivalency of the digital photography game entry with a game solution.

16. The computer-readable medium of claim 15, wherein determining an equivalency of the digital photography game entry with a game solution includes converting the digital images to a standard file format.

17. The computer-readable medium of claim 15, wherein the computer is a web site server and the digital photography game is viewable online from the server.

18. The computer-readable medium of claim 15 having further computer-executable instructions comprising:
determining a reward for participation in the digital photography game; and
publishing the reward for public viewing.

19. The computer-readable medium of claim 18, wherein a reward for participation is based on the type of digital photography game.

20. The computer-readable medium of claim 15 having further computer-executable instructions comprising:
notifying a user of the results of the equivalency determination of the digital photography game entry with the game solution; and
publishing game winners for public viewing.

21. The computer-readable medium of claim 15, wherein the computer is a stand-alone computer and the digital photography game is executable on the stand-alone computer.

22. The computer-readable medium of claim 15 having further computer-executable instructions comprising:
receiving a user configuration of the digital photography game; and
modifying the digital photography game in accordance with the user configuration.

23. A computerized system comprising:
a processor;
a memory coupled to the processor through a system bus;
a computer-readable medium coupled to the processor through the system bus; and
an online digital photography game process executed from the computer-readable medium by the processor to cause the processor to receive a digital photography game entry from multiple participants, to determine an equivalency of the digital photography game entry with a game solution, and to declare a game winner, wherein a digital photography game comprises a set of game instructions and the digital photography game entry comprises a number of digital images associated with each game instruction.

24. The computerized system of claim 23, wherein the online digital photography game process further causes the processor to publish results of the game online.

25. The computerized system of claim 23, wherein the online digital photography game process further causes the processor to notify the multiple participants of the results of the online digital photography process.

26. The computerized system of claim 23, wherein the online digital photography game process further causes the processor to publish game instructions in accordance with a predetermined schedule.

27. The computerized system of claim 23, wherein the online digital photography game process further causes the processor to publish game instructions comprising a series of scavenger hunt clues describing predetermined digital photographs.

28. The computerized system of claim 27, wherein the online digital photography game process further causes the processor to publish the series of scavenger hunt clues comprising locations within a geographical area.

29. The computerized system of claim 27, wherein the online digital photography game process further causes the processor to publish the series of scavenger hunt clues comprising a product of an advertiser.

30. A computerized system comprising:

a processor;

a memory coupled to the processor through a system bus; and an online digital photography game process executed from the memory to cause the processor to receive a digital photography game entry from multiple participants, to determine an equivalency of the digital photography game entry with a game solution, and to declare a game winner, wherein a digital photography game comprises a set of game instructions and the digital photography game entry comprises a number of digital images associated with each game instruction.

31. A networked server system comprising:

means for posting a digital photography game, the digital photography game comprising a set of game instructions;

means for posting digital images associated with, the digital photography game comprising a set if game instructions the online digital photography game in a working game entry area;

means for posting a game solution;

means for determining an equivalency of the posted digital images with the posted game solution;

means for determining a winner; and means for publishing the results of the digital photography game.

32. The networked server system of claim 31, further comprising:

means for awarding one or more of a plurality of participants in the digital photography game based on an order in which an equivalent digital photography game entry with the game solution was received.

33. The networked server system of claim 32, further comprising:

means for notifying one or more of the plurality of participants of the results of the online digital photography game.

34. The network server system of claim 33, wherein the means for notifying creates an electronic mail message to be delivered to the plurality of game participants.

35. A method for rewarding participants in online digital photography games comprising:

displaying multiple digital photography games to a plurality of participants, each game comprising a set of game instructions;

receiving a digital photography game entry from at least one of the plurality of participants, the digital photography game entry comprising a number of digital images associated with each game solution; and determining at least one game winner from the plurality of participants for each digital photography game by determining the equivalency of the digital photography game entry with a game solution.

36. The method of claim 35, wherein the method for rewarding participants in online digital photography games further comprises:

requesting the plurality of participants to submit a digital photography game entry in response to the displaying of the set of game instructions.

37. The method for rewarding participants in online digital photography games of claim 35 further comprising:

rewarding at least one game winner by one or more of recognizing the at least one winner, awarding a prize, and giving an amount of cash.

* * * * *